July 31, 1934.  W. K. BURGESS  1,968,025
BRAKE MECHANISM
Original Filed Sept. 6, 1929  4 Sheets-Sheet 1
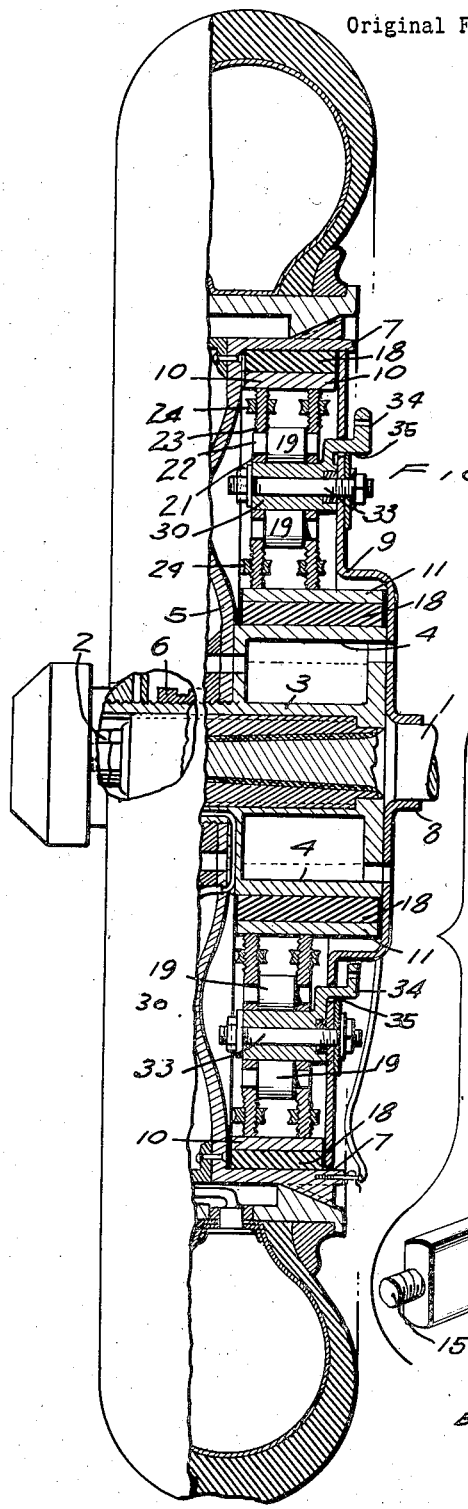
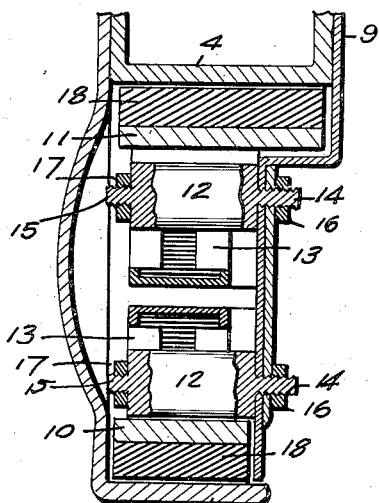
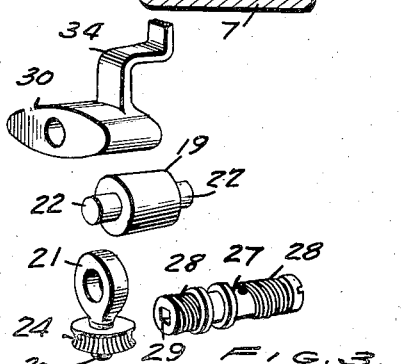
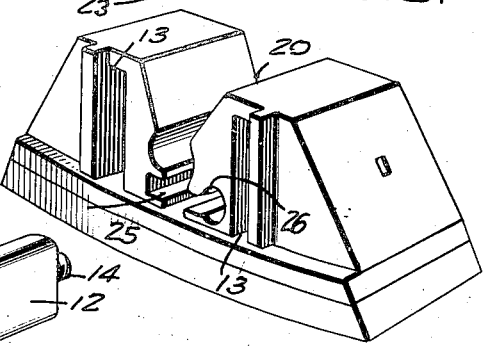
INVENTOR
WALTER K. BURGESS
BY Francis H. Vanderwerker
and Wade Koontz
ATTORNEYS July 31, 1934.  W. K. BURGESS  1,968,025
BRAKE MECHANISM
Original Filed Sept. 6, 1929  4 Sheets-Sheet 2
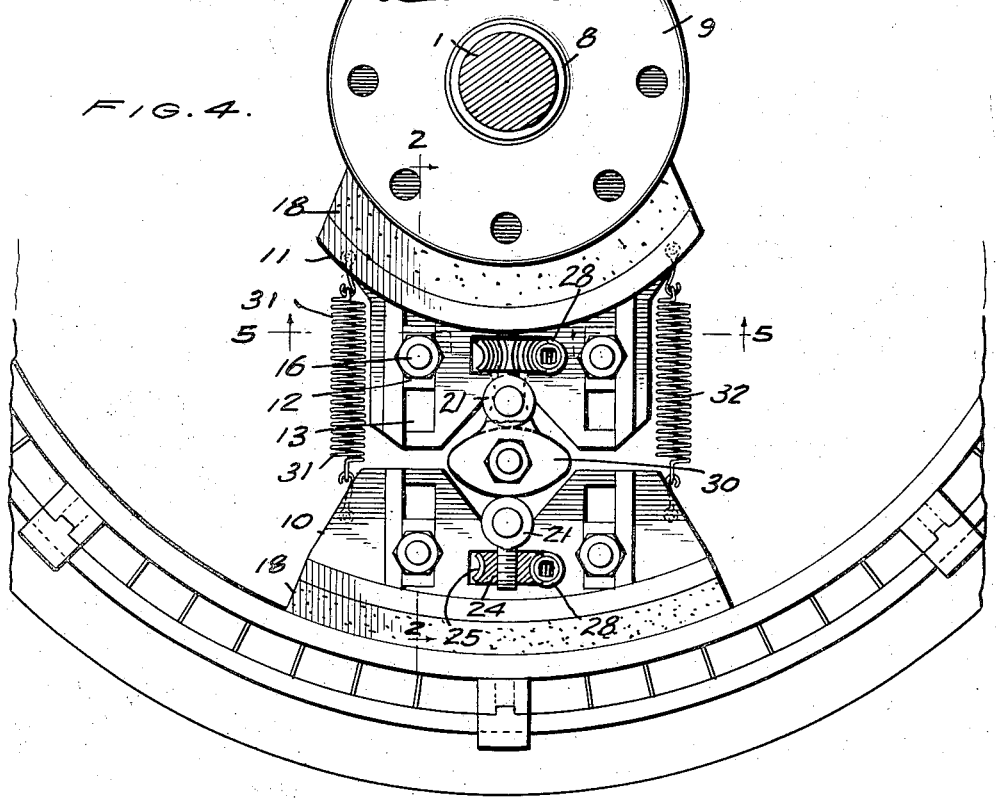
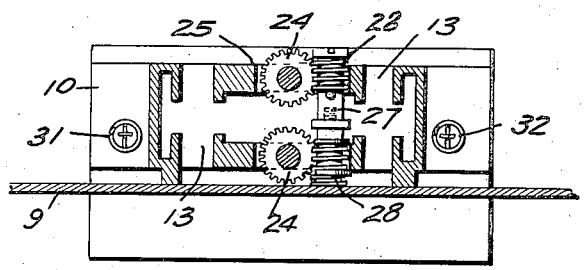
INVENTOR
WALTER K. BURGESS
ATTORNEYS July 31, 1934.  W. K. BURGESS  1,968,025

BRAKE MECHANISM

Original Filed Sept. 6, 1929   4 Sheets-Sheet 3

INVENTOR
WALTER K. BURGESS
BY
ATTORNEYS

July 31, 1934.  W. K. BURGESS  1,968,025
BRAKE MECHANISM
Original Filed Sept. 6, 1929   4 Sheets-Sheet 4
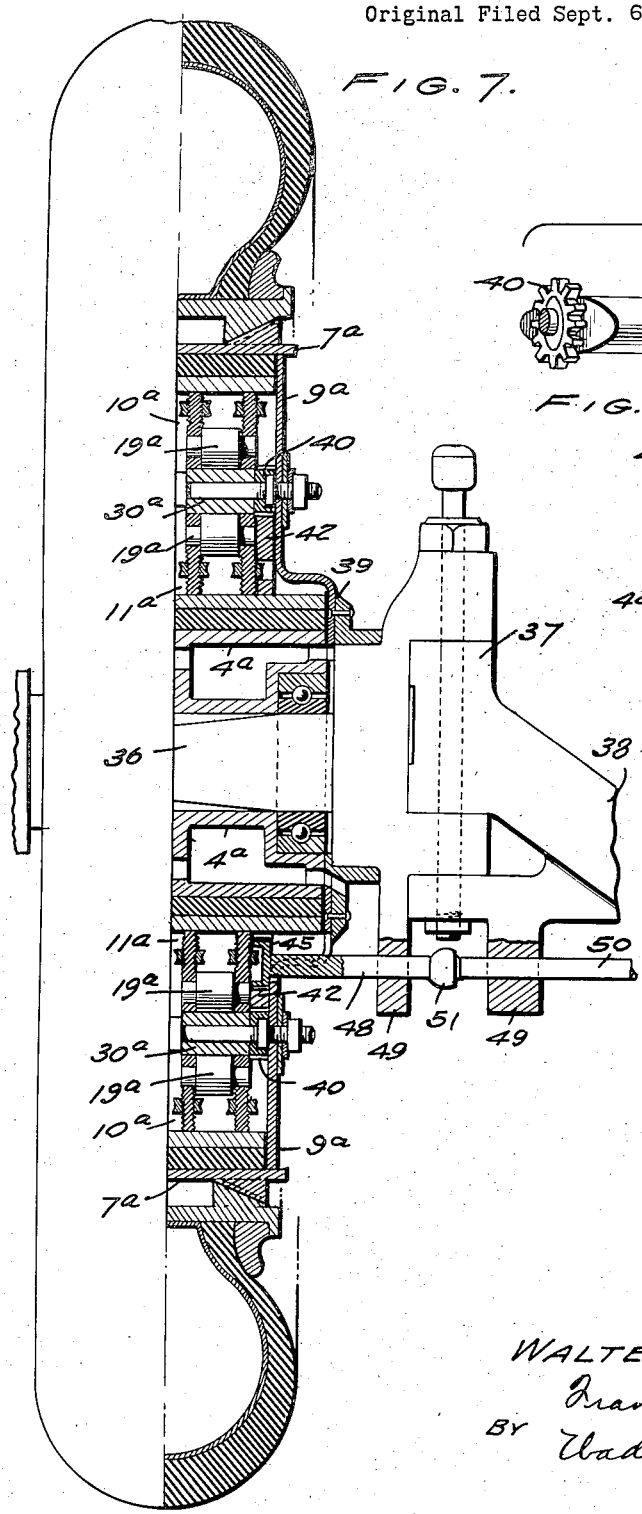
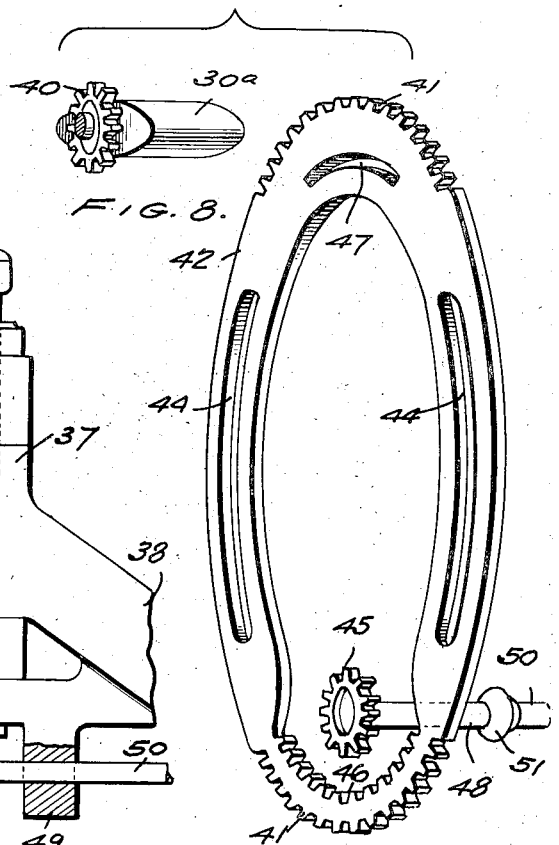
INVENTOR
WALTER K. BURGESS
BY Francis H. Vanderwerker
and Wade Koontz
ATTORNEYS Patented July 31, 1934

1,968,025

UNITED STATES PATENT OFFICE 1,968,025

BRAKE MECHANISM

Walter K. Burgess, Rantoul, Ill.

Original application September 6, 1929, Serial No. 390,813. Divided and this application June 28, 1932, Serial No. 619,715

7 Claims. (Cl. 188—74)

(Granted under the act of March 3, 1883, as amended April 30, 1928; 370 O. G. 757)

The invention described herein may be manufactured and used by or for the Government for governmental purposes, without the payment to me of any royalty thereon.

This application is a division of my co-pending application, Serial No. 390,813, filed September 6, 1929, for Vehicle wheel and has reference to the novel braking structure set forth and described in the parent application.

One of the objects of the invention is to provide a double brake mechanism capable of being applied to inner and outer drums on a wheel, such as a vehicle wheel; the construction being such that an unusually effective brake will result.

Another object of the invention is to provide, in a brake mechanism of the class described, a novel brake-actuating means.

Generally stated, the invention aims to improve, and to enhance, the utility of devices of the particular class to which it appertains.

With the foregoing objects in view, the invention resides in the novel construction, arrangement, and combination of parts hereinafter fully described with reference to the accompanying drawings, wherein:—

Figure 1 is a transverse section of a rear wheel constructed in accordance with the invention;

Figure 2 is a fragmental section, showing the means whereby the brake shoes are guided as they move toward and away from the drums with which they cooperate;

Figure 3 is a composite perspective view illustrating one of the brake shoes and parts associated therewith;

Figure 4 is a fragmental elevation, parts being broken away and removed, in order that the brake shoes and associated parts may be more clearly shown;

Figure 5 is a fragmental section on the line 5—5 of Figure 4;

Figure 7 is a section taken approximately on the line 7—7 of Fig. 6; and

Figure 8 is a composite perspective view disclosing the mechanism whereby the brake shoes are operated in the form disclosed in Figs. 6 and 7;

Figure 6:
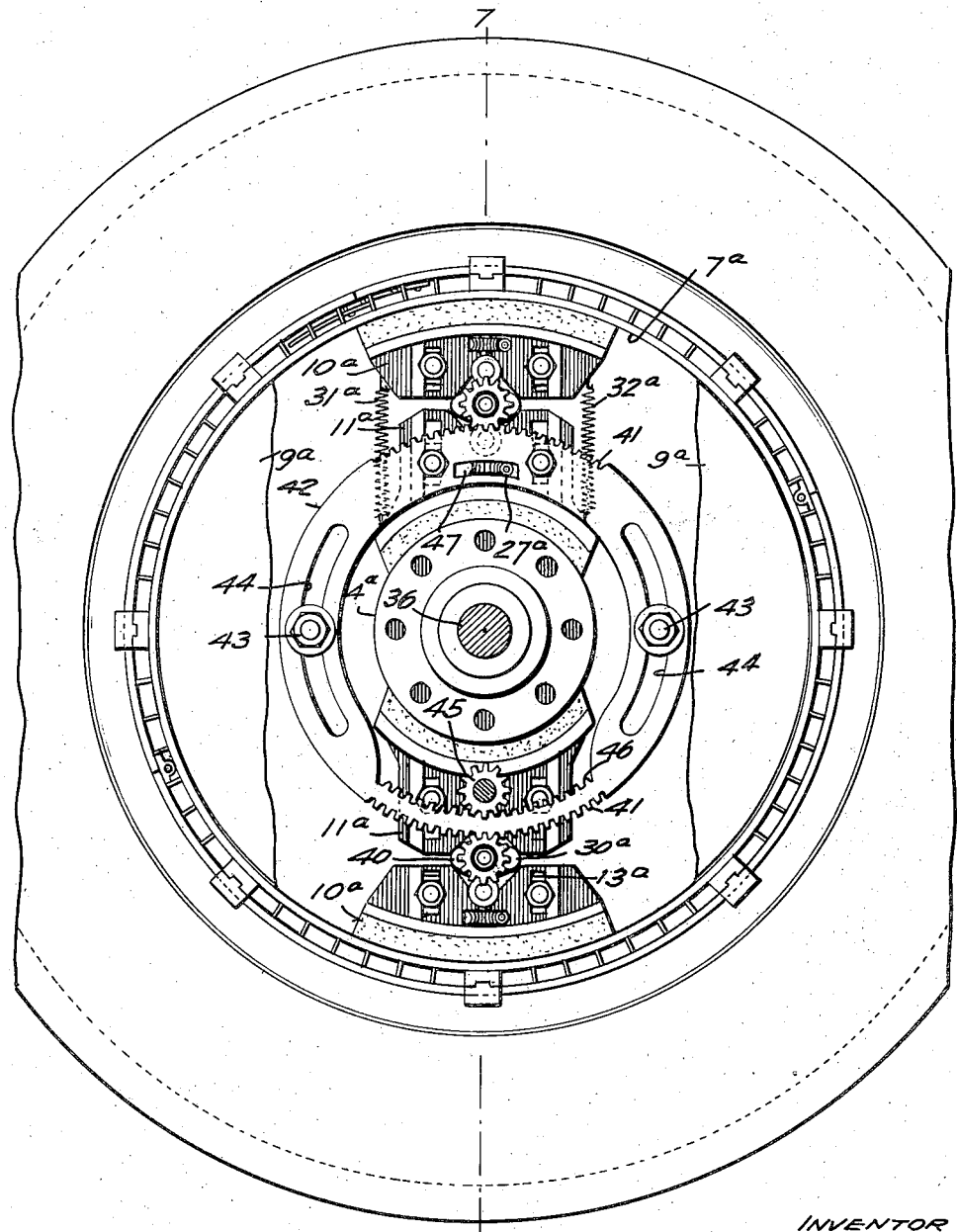
Figure 6 is an elevation showing the brake construction employed in connection with the front wheel of a vehicle, parts being broken away.

Referring to the form shown in Figs. 1 and 4, the numeral 1 designates a power driven rear axle to which is secured, at 2, a wheel hub 3 including a hollow inner brake drum 4. The body of the wheel may be in the form of a disc 5, held on the hub 3 and against one end of the drum 4 by a nut 6, threaded on the hub 3. The wheel body 5 carries, at its periphery, an outer brake drum in the form of a laterally extended annular flange 7. Mounted on the axle 1 is a casing 8 having a disc-extension or skirt 9 which supports the brake shoes and attendant parts, of the brake mechanism which cooperates with the brake drums 4 and 7.

Two sets of brake shoe assemblies are employed and, as shown in the drawings, are relatively disposed on diametrically opposite sides of the axle, each set including an outer brake shoe 10 cooperating with the outer brake drum 7 and an inner brake shoe 11 cooperating with the inner drum 4. The oppositely arranged brake shoes 10 and 11 of each assembly are supported, for sliding movement toward and away from each other, on fixed guides in the form of rectangular blocks 12, received in slots 13 formed in the brake shoes and having threaded studs 14 and 15 on which are mounted the nuts 16 and 17. Each guide is rigidly secured by means of the stud 14 and the accompanying nut 16, to the disc 9 and the nut 17 on the other stud 15 serves as an abutment or keeper whereby the brake shoe is retained on the guide. One of these guides is shown in Fig. 3 and the manner in which they support the brake shoe is shown in Fig. 4.

The brake shoes are of metal and may be supplied with friction facings 18 of metal; or other suitable material such as fiber, wood, etc.; or blocks composed of an assemblage of short sections of brake lining placed on edge and secured within the brake block in such manner as to present their several edge surfaces to the brake drum.

Each brake shoe is provided with a roller 19, disposed crosswise of the shoe and within a V-shaped notch or recess 20 formed in the brake block. The roller is supported, at its journal ends, by a pair of bearing-brackets, respectively composed of a bearing ring 21, in which is received a journal 22 of the roller, and a threaded stem 23. The bearing-bracket stems 23 are threadedly engaged with worm wheels or nuts 24 which are confined within a rectangular opening 25 in the brake shoe. Adjacent the opening 25 is a cylindrical opening 26 within which is journaled a worm shaft 27 having a pair of worms 28 engaged with the worm wheels or nut 24 of the bearing-brackets. A socket 29 is formed in one end of the worm shaft 27 for the reception of a key or crank (not shown) by means of which the shaft is rotated. The rotation of the worm shaft is imparted to the worm wheels or nuts 24, and because the stems 23 of the bearing brackets are threaded into the worm wheels, the rotation of the latter will cause the brackets and the roller carried thereby, to be adjusted inwardly or outwardly with respect to the cam 30 of the brake-actuating mechanism. By means of this arrangement the adjustment of the roller is easily effected.

The inner and outer brake shoes 10 and 11 of each assembly are connected by retractable springs 31 and 32 which tend to draw the brake shoes toward each other and prevent them from dragging on the respective brake drums 4 and 7 when the brakes are not applied. Between the rollers 19 of the brake shoes is located a rocker cam 30, rotatably supported upon a stub shaft 33 secured in the disc-like extension or skirt 9 of the axle casing. The cams 30 are provided with angular arms or cranks 34 extending through slots 35 in the skirt 9. These cranks are adapted to be connected to any appropriate means (not shown) operated from a remote point for rocking the cams to simultaneously engage the outer brake shoes 10 with the outer drum 7 and the inner brake shoes 11 with the inner brake drum 4. Should it be desired, however, the rear wheel brakes can be operated in the same manner and by the same cam mechanism as the front wheels.

The application of the invention to a front wheel structure is shown in Figures 6, 7 and 8. Since the mechanism embodied in the front wheels is, for the most part, substantially similar to that embodied in the rear wheels, parts hereinbefore described have, in Figures 6, 7 and 8, been designated by reference characters already used, with the suffix "a". The front wheel is shown mounted, in the usual way, on the stub axle 36 carried by the knuckle 37 of the axle beam 38. The brake-assembly supporting disc or skirt 9a is welded or riveted to the axle flange as shown at 39. The chief distinguishing characteristic of the structure under consideration is the means for operating the cams 30a. These cams also differ from the previously described cams 30 in that the cranks 34 are replaced by pinions 40. These pinions mesh with external gear teeth 41 on a ring gear 42, which ring gear is supported, for oscillatory rotary movement, on fixed guides 43 secured to the skirt 9a and engaged in the arcuate slots 44 of the ring gear. The ring gear is reduced in width, along one of its toothed segments, to accommodate a drive gear 45 which is engaged with internal gear teeth 46 of narrow segment while its oppositely disposed wider segment is provided with a slot 47 for the purpose of allowing access to the adjacent worm shaft 27a.

The ring drive-gears 45 are fixedly mounted on the end members 48 of a brake operating rod, suitably journaled in bearing brackets 49 of the axle structure, and including the main or intermediate member 50 to which the end members 48 are connected by universal joints 51 whereby the operative integrity of the shaft members 48 and 50 is maintained during the turning of the wheels when steering. The brake operating rod is connected by any conventional means with the usual brake lever or pedal and when rocked about its axis, by the operation of the brake lever or pedal, it causes the ring gear 42 to be rotated, likewise, about its axis for tilting the cams 30a to position the brake shoes 10a and 11a in braking relation with the brake drums 4a and 7a in a manner similar to that hereinbefore described in connection with the rear wheel structure.

A brake mechanism constructed and designed as herein described provides a very efficient braking action due to the double braking pressure applied on two opposite sides of the axis of rotation of the wheel. As will be apparent, a large portion of the braking area is placed at points nearer the tread than is now possible with conventional structures and the total brake area is greatly increased. On large heavy trucks with wide steel or wood wheels, this is very desirable. Moreover, the old braking system tended to wear the brake lining to a feather edge at each end, leaving it but slightly worn at other points. In the brake mechanism of the present invention, however, the thrust on the brake block is direct on a line at right angles to the center of each drum, thereby insuring an effective, continuous, and equal pressure throughout its surface.

Having thus described the invention what is claimed is:—

1. In a braking mechanism, a brake shoe, a worm journaled in said shoe, worm wheels also journaled in said shoe and meshing with said worm, bearings threaded into said worm wheels, and an antifriction device journaled in said bearings, said worm having tool engaging means whereby it may be rotated for effecting adjustment of the said bearings.

2. A braking mechanism including concentric inner and outer rotatable brake drums, a stationary skirt, inner and outer brake shoes between the said drums and arranged in pairs on diametrically opposite sides of the drum centers, guides on said skirt and supporting said brake shoes for sliding movement toward and away from the said inner and outer drums, a rocker cam between the brake shoes of each pair, stub shaft fixedly secured to said skirt and respectively supporting a cam, and means for imparting rocking movement to the said cams.

3. A brake mechanism including inner and outer brake drums, inner and outer brake shoes confined between adjacent portions of the drums and movable outwardly of each other to be engaged with the said inner and outer brake drums respectively, a rocker cam mounted between the brake shoes for moving same against the drums, and means for actuating the cam including a pinion on the cam and a remotely operated gear in mesh with said pinion.

4. A braking mechanism including inner and outer brake drums, a pair of inner and outer resiliently coupled brake shoes confined between adjacent portions of the drums and movable outwardly of each other to be engaged with the said inner and outer brake drums respectively, and a rotatable cam between the shoes for moving the latter into engagement with the drums, said cam having an actuating crank.

5. In a brake mechanism, a brake shoe comprising a brake block having a friction facing and hollowed out rearwardly of the facing to provide a transversely extending rectangular space of shallow depth in communication along one side thereof with a laterally disposed cylindrical opening, said block being notched to provide a roller accommodating space outwardly of but open to the said rectangular space, a roller disposed in said roller-accommodating space, a pair of bearing rings in which the ends of the roller are journaled, said bearing rings having threaded stems depending into the said rectangular space, a worm nut threaded on each stem and confined within the said rectangular space, a worm shaft journaled for rotation within the said cylindrical opening and in mesh with said worm nuts.

6. A brake mechanism having, in combination, a pair of inner and outer concentric brake drums, pairs of resiliently coupled and oppositely movable brake shoes positioned between the said inner and outer brake drums, a rotatable cam between coupled shoes and operable when rotated to expand the shoes relatively and simultaneously into braking contact with the said drums, a pinion fixed on each cam, a ring gear concentric to the said drums and having external gear teeth in mesh with the said pinions of the cams, said ring gear also having internal gear teeth, means supporting said ring gear for oscillatory rotatory movement, a brake-operating rocker shaft, and a gear fixed on said shaft and in mesh with the internal gear teeth of the said ring gear.

7. A brake mechanism having, in combination, an axle, a wheel hub on said axle and having an integral extension constituting an inner brake drum, a wheel body disc fixed on the said hub and having at its outer periphery a laterally extending annular flange disposed over and outwardly of the hub brake drum to form an outer brake drum, a skirt fixedly supported relatively to the wheel hub and wheel body disc and bridging the space between the inner and outer brake drum on the side opposite to the wheel body disc, pairs of resiliently coupled and radially separable brake shoes disposed between the said inner and outer brake drums, means on the skirt supporting and guiding the said brake shoes in their radial movements, rocker cams between the coupled brake shoes and respectively provided with an operating element exposed through an opening in the said skirt, means secured to the said skirt and rotatably supporting the said rocker cams, and means operatively connected with the said operating elements of the cams for operating the latter.

WALTER K. BURGESS.